Figure 1:
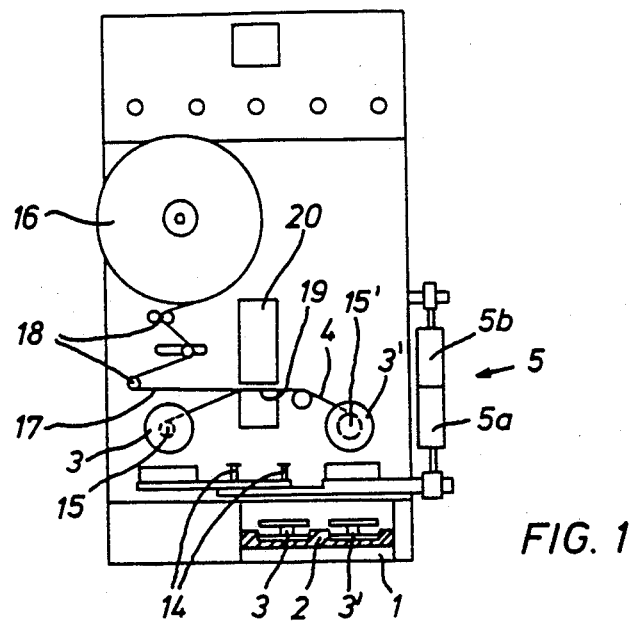

United States Patent [19]

Toral et al.

[11] Patent Number: 4,811,911
[45] Date of Patent: Mar. 14, 1989

[54] APPARATUS FOR WINDING A RECORDING CARRIER ONTO A PAIR OF SPOOLS

[75] Inventors: José Toral; Gottfried Lutz, both of Munich, Fed. Rep. of Germany

[73] Assignee: Agfa-Gevaert Aktiengesellschaft, Leverkusen, Fed. Rep. of Germany

[21] Appl. No.: 73,002

[22] Filed: Jul. 13, 1987

[30] Foreign Application Priority Data

Jul. 18, 1986 [DE] Fed. Rep. of Germany ....... 3624305

[51] Int. Cl.$^4$ ............................................. B65H 19/30
[52] U.S. Cl. .................................................. 242/56 R
[58] Field of Search ......... 242/56 R, 56 A, 58.1–58.5; 156/502, 505, 506

[56] References Cited

U.S. PATENT DOCUMENTS

| | | | |
|---|---|---|---|
| 4,540,132 | 9/1985 | Kubo | 242/56 A X |
| 4,563,234 | 1/1986 | Kubo | 242/58.4 X |
| 4,629,138 | 12/1986 | Kubo | 242/56 R |

Primary Examiner—John M. Jillions
Attorney, Agent, or Firm—Connolly and Hutz

[57] ABSTRACT

An apparatus for winding a video tape on to the spools of a cassette comprises a winder for winding the video tape on to spools and a "delivery" device for delivering a pair of spools to the winder. The "delivery" device comprises a movable cylinder containing two pistons, which cylinder acts on a swivel arm, the free end of which arm carries a rotatably mounted arm. This arm has a pair of holders for holding the pair of spools and a guide device for guiding the tape leader situated between the spools. The transfer device described above transfers the pair of spools from the container to the pins of the winder and from the winder back to the container after the winding process.

7 Claims, 3 Drawing Sheets

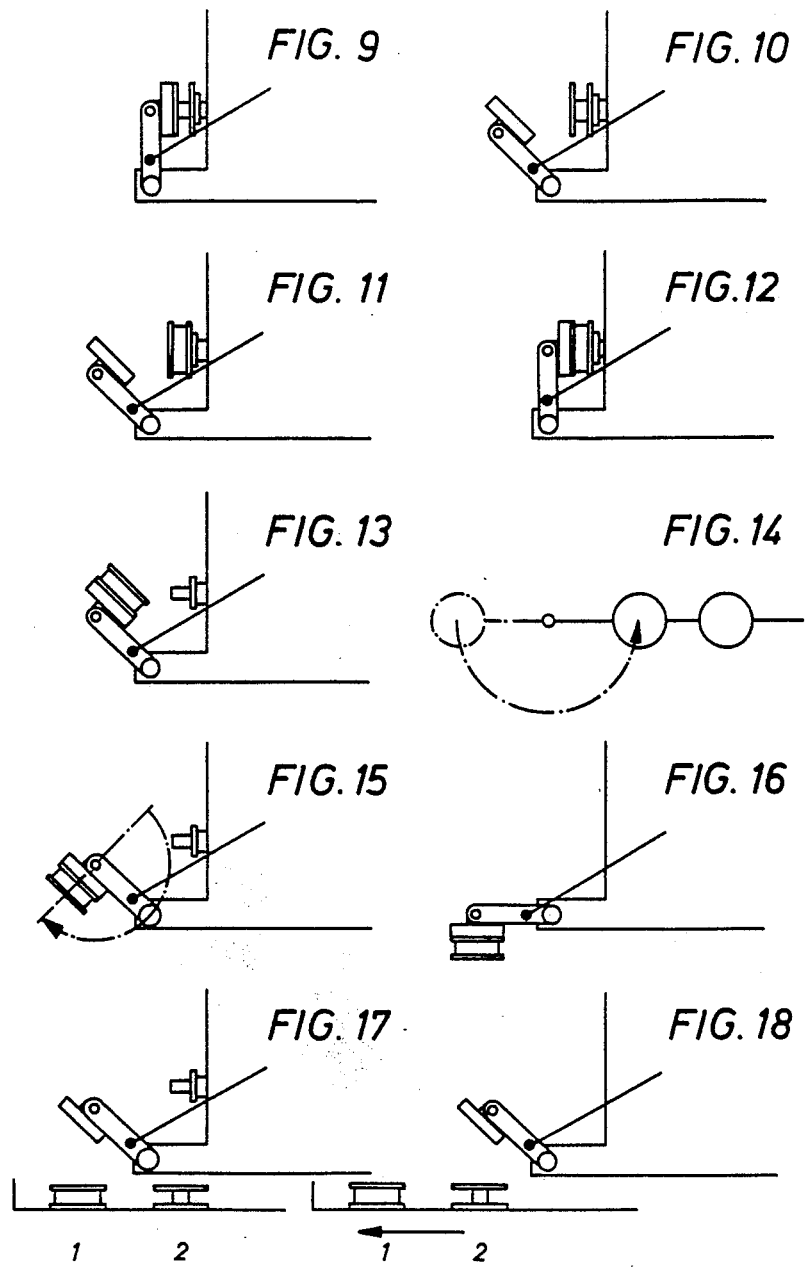

APPARATUS FOR WINDING A RECORDING CARRIER ONTO A PAIR OF SPOOLS

This invention relates to an automatic apparatus for winding a recording carrier, in particular a video tape, on to a pair of spools.

Video cassettes are nowadays produced in large batches and it is therefore important to carry out the individual steps of the process rationally and with little waste. When a magnetic tape is wound on to a pair of spools which are then fitted to a video cassette, some steps of the process are still carried out manually, which is not rational. Furthermore, it would be desirable to have the pair of spools close together when they are mounted on a container and transferred to the winder and equally when they are inserted into the housing of a video cassette after they have passed through the winder. This, however, is contrary to the requirement that the two spools should be as far apart as possible for troublefree winding of the magnetic tape on to the spools.

Automatic devices for winding a video tape on to a pair of spools have been disclosed in U.S. Pat. No. 4,563,234 and U.S. Pat. No. 4,540,132. According to the teaching of these disclosures, a pair of spools connected by a tape leader and mounted in a container which is moved forwards rhythmically on a conveyor belt is transferred from its horizontal position into the vertical position by rotation through 90° before it reaches the position from which it is supplied to the winder. The pair of spools is then taken up by a gripper system, rotated through 180° by a rotary arm and mounted on the pair of pins of a winder, one of which pins is displaceable. By displacement of the movable pin, which incidentally causes part of the tape leader to be unwound, the pair of spools can be brought into a position in which the tape leader can be cut and the magnetic tape glued on and wound and when the required length of tape has been wound it can be cut and again glued to the tape leader. The original distance between the spools is then reestablished by shifting the movable pin, and the gripper system of the rotary arm grips the pair of spools and returns it to the delivery position. It is clear from the sequence of steps described above that the delivery device described is relatively complicated and time consuming and has a large number of moving parts which are subject to wear. Furthermore, there is the risk of the gripper system damaging the magnetic tape during transport and winding.

The problem therefore arose of providing an automatic apparatus for winding a tape on to spools for a cassette in which the disadvantages described above would be obviated.

The present invention has solved this problem by means of an apparatus according to the description and drawings. The operation of such an apparatus is less time consuming than that of the known apparatus, as will be clear from the description, since some of the steps carried out by the feed device do not take place successively but simultaneously, and the apparatus is more reliable, less subject to wear and relatively simple in construction.

Figure 2:
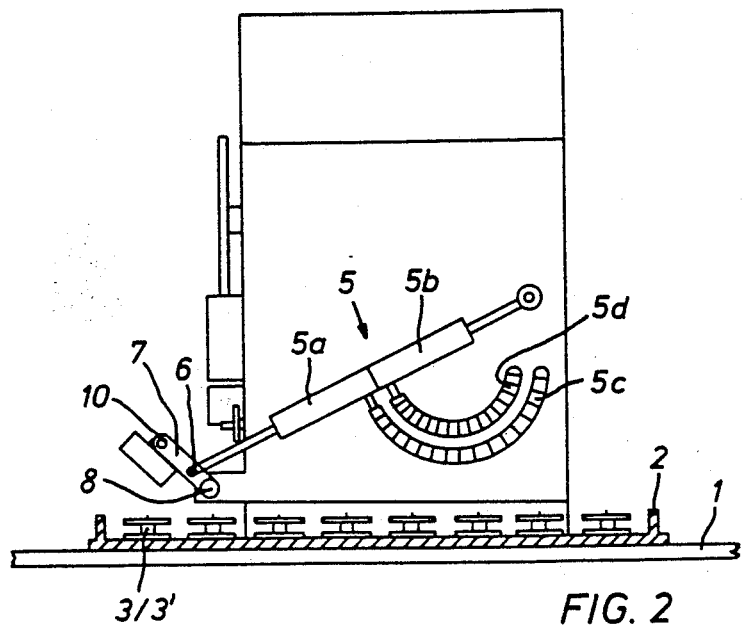
Figure 3:
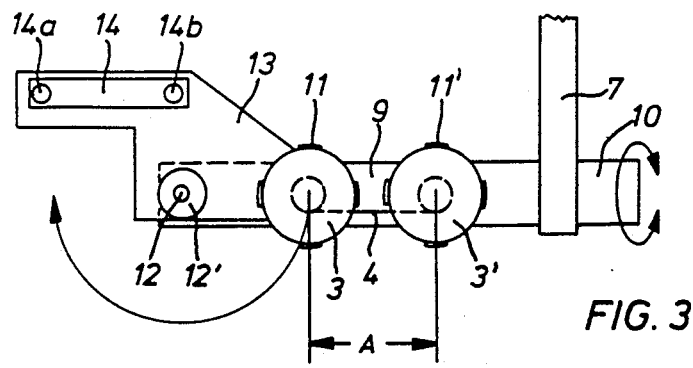
Figure 4:
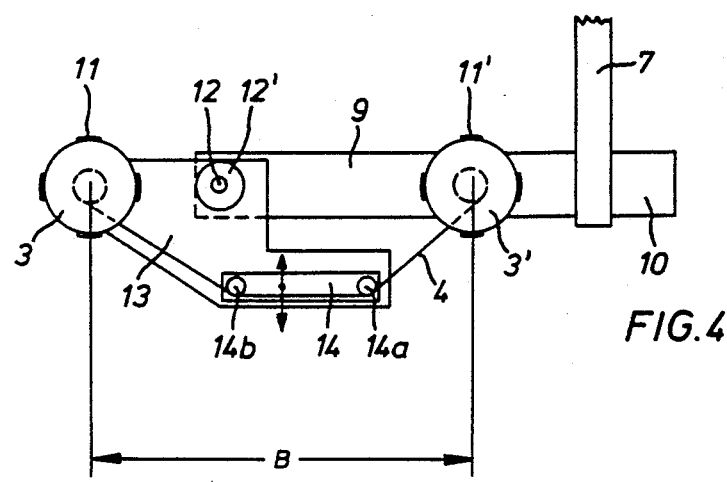
Figure 5:
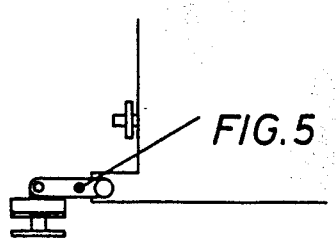

The invention will now be described with reference to the schematic drawings in which FIGS. 1 and 2 are a front view and side view, respectively, of one example of the apparatus according to the invention for winding a recording carrier on to a pair of spools, FIGS. 3 and 4 are front views of the apparatus according to the invention for transferring the pair of spools to the winder in two different positions of the rotary arm and of the holders with the spools mounted thereon, and FIGS. 5 to 18 are schematic views showing the sequence of steps of the process of transfer and the process of winding according to the invention.

An apparatus for winding a recording carrier on to a pair of spools corresponding to FIGS. 1 and 2 substantially comprises a delivery and removal device for containers containing a pair of spools which may, for example, carry a tape leader, a device for transferring a pair of spools to the winder and a winder in which, for example, a magnetic tape is connected to both spools of the pair.

Only the transfer device is claimed for the invention, the delivery and removal device and the winder belonging to the state of the art.

The delivery and removal device comprises a conveyor belt (1) on which a container (2) is moved forwards rhythmically. The container contains a plurality of pairs of spools (3,3') in the plane of the conveyor belt. A tape leader (4) has already been wound onto the spools. The container (2) is preferably so designed that the spools (3,3') are situated at the same distance apart as later in the magnetic tape cassette.

The transfer device according to the invention comprises a movable two-step cylinder (5) containing two pistons (5a,5b) working in opposition. One piston (5b) bears against the side wall of the winder by means of a rod while the other piston (5a) is connected to about the center of the swivel arm (7) at the point (6) by another rod. The cylinder therefore has three stop locations:

(a) both pistons withdrawn,
 (b) one piston extended,
 (c) both pistons extended.

The two pistons may be operated pneumatically, for example by way of feed pipes 5c/5d.

The pivot (8) of the arm (7) is also mounted on the side wall of the winder. Another arm (9) is rotatably mounted at the free end of the arm (7). This arm (9) is parallel to the axis of rotation of the arm (7), as may be seen from FIGS. 3 and 4, and it can be suitably rotated. A motor driven holder (11') for holding one spool of the pair (3,3') is rotatably mounted on the arm (9) at a point adjacent to the pivot (10). The holder is most preferably a circular cylindrical body having several radially displaceable claws evenly distributed over its cylindrical external surface, these claws being operated by compressed air to be pushed outwards against the force of a spring embracing the external circumference of the circular cylindrical body. Situated between these claws are axially displaceable, so-called holding down clamps which are under the bias tension of springs and serve to press the flange of the mounted spool against the bent end of the claws. A rotatable arm (13) with rotating device (12') is mounted on the pivot (12) at the free end of the arm (9). The axis of rotation of the arm (13) extends parallel to the axis of rotation of the holder (11'). A non-rotatable holder (11) is fixed to one end of the rotary arm (13) while a guide device (14) for the tape is fixed to the other end of this arm. This guide device has two guide rollers (14a,14b) arranged at some distance apart, and each of these rollers has lateral flanges. The guide device (14) is displaceable parallel to the surface of support of the holder (11). The position of the pivot (12) on the arm (9) and the distance of the pivot (12) from the holder (11) are so arranged that when the holders (11,11') are at their least distance apart A (FIG. 3) this distance is equal to the distance between the pair of spools (3,3') in the container (2) while the maximum distance B (FIG. 4) between the holders (11,11') is equal to the distance between the pins (15,15') of the winder.

The winder also comprises, in known manner, a supply spool (16) for the magnetic tape (17), a delivery system (18), a table (19) for supporting the tape and a device (20) containing a cutting and sticking mechanism, and the movable pins (15,15'), at least one of which is motor driven.

Figure 6:
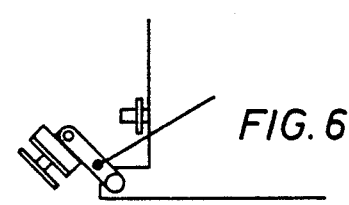
Figure 7:
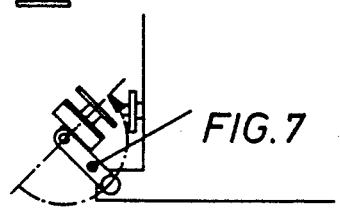
Figure 8:
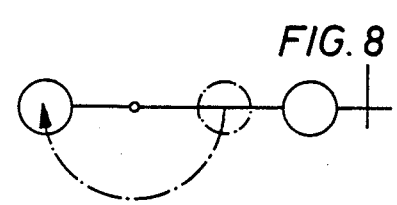

The operation of the device for winding the magnetic tape onto the pair of spools comprises the repetition of the following steps:

The conveyor belt (1) suitably controlled, for example mechanically or by a photoelectric cell, carries the container (2) to a position in which the pair of spools (3,3') is exactly under the transfer device which is in a position of readiness (FIG. 2). The arm (7) is then swung downwards by pneumatic ejection of the piston (5b) (FIG. 5) and at the same time the rotary arm (13) attached to the arm (9) takes up the position shown in FIG. 3 so that the holders (11,11') are at their minimum distance apart A. The holders grip the pair of spools together with the tape leader (4) connecting them, and lift the spools out of the container by withdrawal of the piston (5b) (FIG. 6). The rotary drive (10) then rotates the arm (9) through 180° so that the spools which were originally facing downwards are now facing upwards (FIG. 7). The rotary drive (12') on the rotary shaft (12) then swings the rotary arm (13) (FIG. 8) through 180° into the position shown in FIG. 4 so that the holders (11,11') with the spools suspended thereon (3,3') are now at their maximum distance apart B. At the same time, the flanged guide rollers (14a,14b) of the guide element (14) grip the tape leader (4).

During these rotations, the tape leader (4) is unwound from the movably mounted spool (3'). The swivel arm (7) is then moved towards the winder by operation of the piston (5a) (FIG. 9) and the two spools are mounted on their pins (15,15'). At the same time, the guide device (14) is moved upwards and the tape leader (4) which is situated between the flanges of the guide rollers (14a,14b) is pushed between the table (19) and the cutting and sticking device (20). When the guide device (14) has been lowered, the tape leader (4) lies on the table and the arm (7) is swung away from the pins (15,15') by operation of the piston (5a) (FIG. 10) to remain in the waiting position. The winding process then begins. This may comprise the usual sequence steps, namely cutting of the tape leader (4), attachment of the magnetic tape (17) by glueing by means of the appropriate device (20), winding of the magnetic tape on to the spool (3') to the required length, cutting of the magnetic tape (17) and attachment by glueing of the remainder of the tape leader left on the spool (3).

When the complete package of tape has been produced as described above (FIG. 11), these processes are repeated in the reverse sequence. The arm (7) with the holders removes the pair of spools and at the same time the guide device lifts the tape from the table (FIGS. 12 to 13). The rotary arm 13 then rotates backwards (FIG. 14) to the position shown in FIG. 3 and at the same time the driven holder (11') winds the tape leader (4) on to the spool (3') until the tape no longer sags between the spools. The holder (11') may be driven by various means, for example by compressed air, by an electric motor or by transmission of the rotation of the pivotal shaft (12') to the mounting pin of the holder, for example by means of a V belt. The rotary arm (9) is then rotated through 180° (FIG. 15) whereupon the swivel arm (7) is moved into the horizontal position by suitable operation of the piston, and the holders deposit the pair of spools in the container (2) in their previous position (FIG. 16). The container then moves forward by one position (FIG. 17) so that the next pair of spools comes to lie under the transfer device and the process described above is repeated (FIG. 18).

In addition to the advantages already described above, the transfer device according to the invention has the advantage that it can easily be attached at quite reasonable cost to a state of the art winder on which the pair of spools had previously to be mounted by hand with manual insertion of the tape leader. It is therefore not necessary to embark on an expensive investment in a complete new automatic device for winding magnetic tape on to a pair of spools.

Variations of the apparatus described above and of the sequence of operational steps are, of course, possible. Thus, for example, a simple additional device may be provided so that the pair of spools can be supplied and wound without a tape leader between them.

We claim:

1. Apparatus for transporting a pair of spools capable of carrying magnetic tape and having a tape leader to and from a winder and holding the spools at the winder during the application of magnetic tape, comprising:

means for conveying a pair of spools having a tape leader to a transfer station, said spools being closely spaced upon delivery, and having the tape leader positioned between them, a winder assembly for applying magnetic tape to said spools including two mounting pins on which said spools are removably mountable and means for connecting tape leader positioned between the spools to a magnetic tape, a transfer assembly comprising a swivel arm pivotably mounted on a pivot pin having attached to the swivel arm at a point removed from the pivot pin, means for acting on the swivel arm to pivot the swivel arm on said pivot pin, a driven first rotatable arm supported perpendicularly to and rotatable in said swivel arm at a point substantially removed from said pivot pin, a second swinging arm oscillating on said rotatable arm, a first holder for one of said spools carried on the first rotatable arm and having a surface for mounting said spool and a second holder for one of said spools carried on one end of said second swinging arm, and having a surface for mounting said spool, a guide element mounted on said second arm at a position away from said second holder and displaceable parallel to the mounting surface of the holder to introduce the interpositioned tape leader into the winder assembly, said first and second arms constructed and arranged that the plane of rotation of said second swinging arm is parallel to the mounting surfaces of said holders, said second holder having two positions such that the minimum distance between the holders is equivalent to the distance between the centers of the spools in the conveying means and the maximum distance between the holders is equivalent to the spacing between the mounting pins of the winder assembly, whereby the spools are delivered to the transfer assembly at the transfer station and received from the transfer assembly at the transfer station.

2. Apparatus according to claim 1 characterised in that the means for acting on the swivel arm includes a cylinder (5) containing two pistons (5a, 5b) acting in opposite directions and designed to be operated by compressed air from pipes (5c, 5d).

3. Apparatus according to claim 1, characterised in that the cylinder (5) and/or the rotatable arms and/or the rotatable holder is or are operated by compressed air.

4. Apparatus according to claim 1, characterised in that the holder (11, 11') are at their minimum distance apart when the holders face the the transfer station and when both pistons are fully extended and in that the holders are at their maximum distance apart when they face the pins of the winder and when at least one of the pistons is withdrawn.

5. Apparatus according to claim 1 characterised in that the first holder is driven by a rotating device of the rotary arm by way of a belt.

6. Apparatus according to claim 1, characterised in that when the holders are at their maximum distance apart due to operation of the rotary arm, flanged rollers of the guide device take up the tape leader.

7. Apparatus according to claim 6, characterised in that the range of movement of the guide device is calculated to enable the rollers to deposit the tape leader on a table of the winder.

* * * * *